United States Patent
Hasha

[11] 3,871,209
[45] Mar. 18, 1975

[54] METHOD OF EXTERNALLY TESTING CONNECTIONS BETWEEN TUBULAR MEMBERS

[76] Inventor: Malvern M. Hasha, 111 Acacia St., Lafayette, La.

[22] Filed: Mar. 25, 1971

[21] Appl. No.: 127,949

[52] U.S. Cl. .................................. 73/49.1, 73/46
[51] Int. Cl. .............................................. G01m 3/28
[58] Field of Search ............ 73/40.5 R, 46, 49.1, 37, 73/40; 138/90; 285/333, 334

[56] References Cited
UNITED STATES PATENTS

| | | | |
|---|---|---|---|
| 1,932,427 | 10/1933 | Stone | 285/334 |
| 3,034,339 | 5/1962 | Gawlik | 73/46 |
| 3,396,575 | 8/1968 | Sjoberg et al. | 73/40.5 R |

Primary Examiner—Richard C. Queisser
Assistant Examiner—Joseph W. Roskos
Attorney, Agent, or Firm—Jack W. Hayden

[57] ABSTRACT

Connections between tubular bodies or members are tested by making the connection up a desired or predetermined amount, surrounding the connection externally to seal it off, and a suitable fluid medium is supplied externally to the surrounded connection or test the connection.

In one embodiment, the connection between the tubular members is only partially made up to a predetermined condition at which a primary or initial seal should be established in the connection, unless there is some defect, foreign matter, or imperfection in the connection or tubular members. The connection is then surrounded externally to seal it off, and suitable fluid pressure is supplied externally to the surrounded, partially made up connection in an amount up to approximately the collapse pressure rating of the tubular bodies; however, in most instances, the fluid pressure will be applied to the partially made up connection at a predetermined amount less than the collapse pressure rating of the tubular bodies. While the pressure is maintained on the partially made up connection, any pressure decay from the maintained amount is noted or determined as an indication of a leak in the connection, which in turn indicates a defect, foreign matter, or imperfection in the connection.

In another embodiment, the connection may be fully made up after it has been tested in the partially made up position, and it may then be tested by applying an external fluid pressure to the surrounded connection in an amount up to approximately the collapse pressure rating of the tubular members, and while such pressure is maintained, any pressure falloff or decay from the maintained amount of pressure is noted or determined as an indication of a leak or failure of the connection when fully made up.

In still another embodiment, the connection is backed off from its fully made up position, but retained in a relationship which should establish the primary or initial seal therein, and while in this partially made up condition, the connection is again subjected to the external pressure test as above described to determine if it leaks.

The above tests may be conducted while the connection is not in tension; they may be conducted with the connection in tension; or they may be conducted when the connection is out of tension and then placed in tension.

23 Claims, 9 Drawing Figures

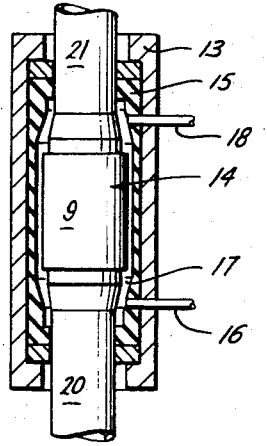
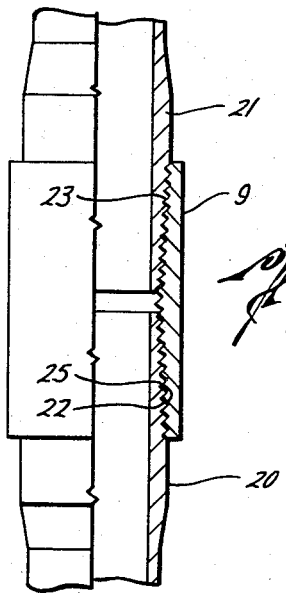
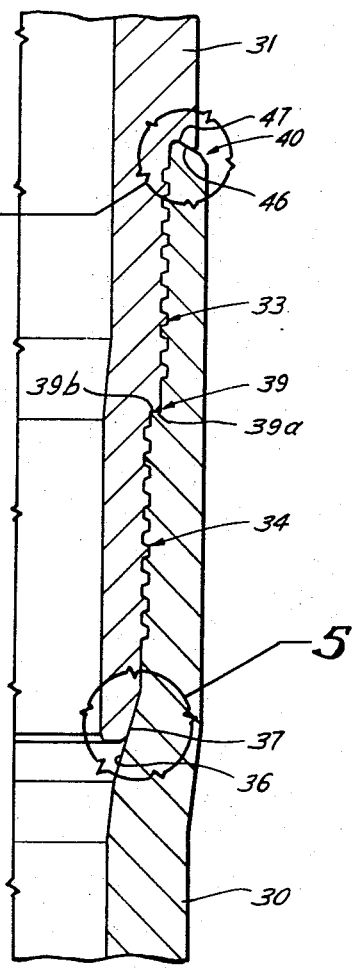
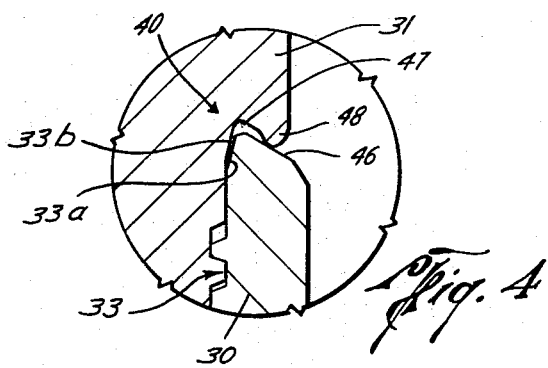
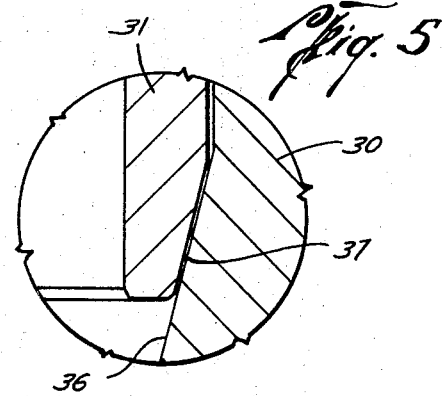

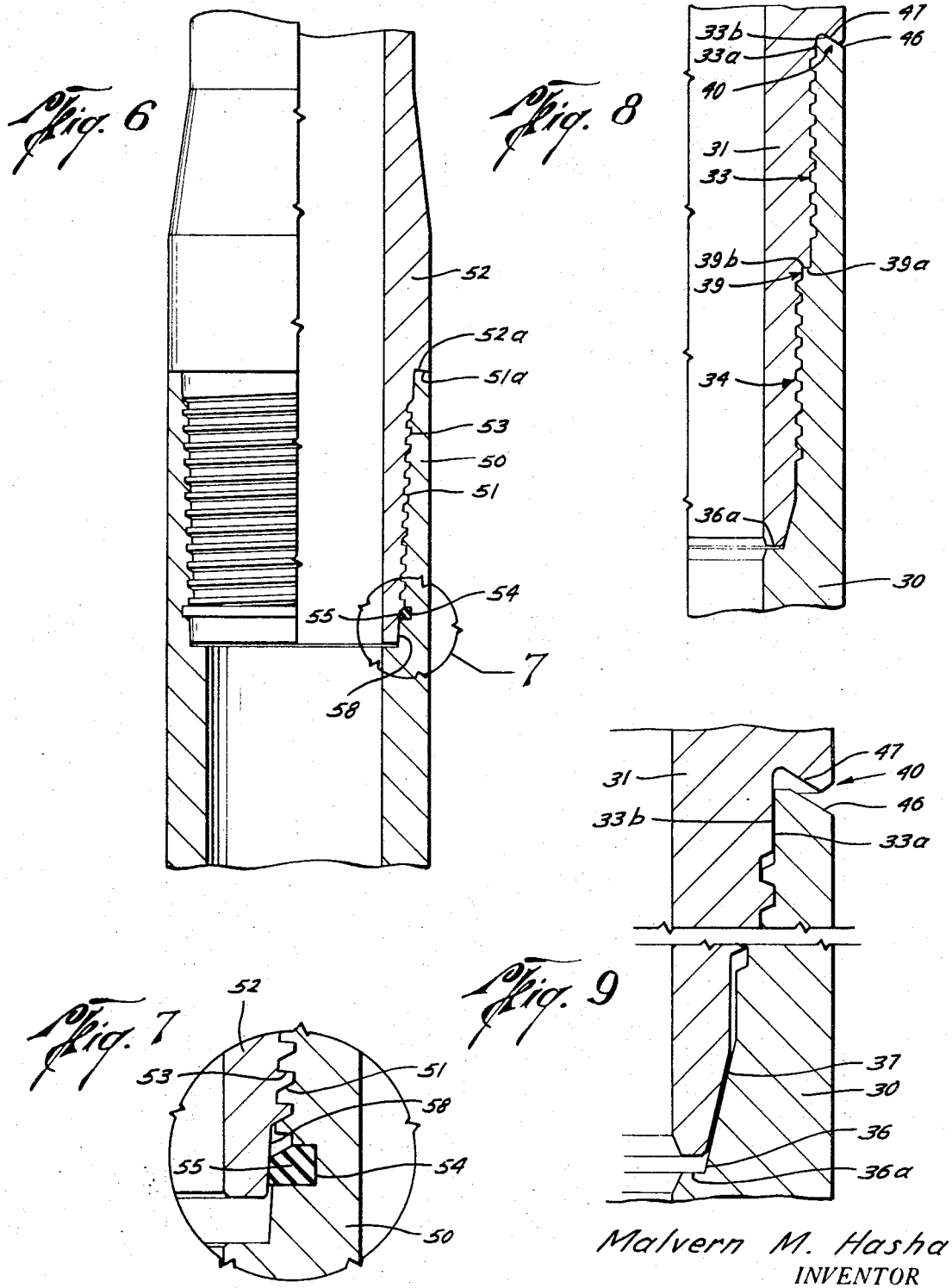

METHOD OF EXTERNALLY TESTING CONNECTIONS BETWEEN TUBULAR MEMBERS

CROSS REFERENCE TO RELATED APPLICATION

The present invention relates to a method of externally testing connections between tubular members, and my copending application Ser. No. 127,953 filed Mar. 25, 1971, for "Method of Stage Internal Pressure Testing Connections Between Tubular Members" relates to an internal test protection method.

BACKGROUND OF THE INVENTION

1. Field of the Invention

The field of the invention relates to the testing of tubular connections by applying a pressure medium thereto. The pressure medium applied to the connection indicates whether or not there are any leaks in the connection, or if the joint is damaged so as to prevent proper seating and sealing of the joint surfaces.

2. Description of the Prior Art

In prior art methods of testing connections of tubular members, an internal pressure is applied at the connection in an endeavor to test it for leaks or determine the integrity of the connection. One such device for internal testing is shown in U.S. Pat. No. 3,196,666. However, even though at least several internal test devices have been employed for a number of years to apply a high internal test pressure to the fully made up connections, such prior art manner of testing actually energizes or increases the bearing and sealing pressure in most, if not all connections, and tends to hide or mask any leaks that may be present in the connections, rather than expose leaks in, or damage to, the connection which might subsequently become troublesome in use.

One device for external testing of connections is shown in U.S. Pat. No. 3,371,521. While external testing of connections between tubular members has been done, connections have not, so far as known by applicant, been tested to the collapse pressure rating of the tubular members. Nor have the connections between tubular members, so far as known to applicant, been tested in only partially madeup relationship. On the contrary, so far as known to applicant, the prior art devices, internal or external, have always been used when the connection is in fully madeup position - or what was understood to be fully madeup position.

SUMMARY OF THE PRESENT INVENTION

A primary object of the present invention is to aid in overcoming pollution problems resulting from leaks in flow lines, pipelines, oil and gas wells, as well as where tubular members are connected in any of various industrial applications.

A further object is to apply a low torque to the connection between tubular members to form an initial seal therebetween and then test it in such condition in an endeavor to test the connection under more critical conditions.

The present invention is directed to a method of externally testing connections between tubular members by stage testing the connection at various stages of makeup of the connection and at various pressures to test the connection for leaks and damages.

Still another object of the present invention is to apply less than full makeup torque to a connection and apply a pressure fluid externally of the connection for testing thereof at the partial makeup condition of the connection.

Yet another object of the present invention is to provide a method of testing a tubular connection which tends to de-energize rather than energize the connection for determining leaks therein or damage thereto.

Still a further object of the present invention is to provide a method of externally testing a connection by applying only a partial amount of the recommended full makeup torque to the connection for testing of the connection at such partial makeup torque, and thereafter fully making up the connection to the recommended torque and testing such connection either in tension or out of tension, or out of tension and then in tension.

Another object of the present invention is to test connections between tubular members by applying a fluid medium under pressure externally of connections up to a pressure not greater than the collapse pressure rating of the tubular members for determining the integrity of the connection.

Yet a further object of the present invention is to provide a method of testing connections, which method is not adversely affected by internal scale, which does not damage any internal coating on the tubular members, and which may be conducted in a manner to tend to de-energize the connection rather than energize it (which aids in forming a seal in the connection and thereby masks leaks and damage in the connections) to thereby apply a more critical test to determine the integrity of the connection.

Other objects and advantages of the present invention will become more readily apparent from a consideration of the following description and drawings.

BRIEF DESCRIPTION OF THE DRAWINGS

FIG. 1 is a schematic representation of a suitable form of an apparatus which may be employed for the external testing of a connection;

FIG. 2 illustrates in quarter sectional view one form of connection to which the present invention may be applied;

FIG. 3 illustrates a partial sectional view of still another form of connection which may be tested by the present invention;

FIG. 4 is an enlargement of the portion that is circled in FIG. 3 but showing the connection damaged and in only a partially made up relation or position;

FIG. 5 is an enlargement of the portion of FIG. 3 that is circled but illustrating that the primary or initial seal is not established;

FIG. 6 illustrates still another form of connection which may be externally tested by the present invention;

FIG. 7 is an enlarged view of the connection of FIG. 6 in only partially made up relationship;

FIG. 8 is illustrative of still another connection which may be tested by the present invention; and FIG. 9 is a partial showing of the connection of FIG. 8 when it is not in fully made up relationship but with the primary or initial internal seal established.

DESCRIPTION OF THE PREFERRED EMBODIMENT

One suitable form of device for accomplishing the testing method of the present invention is illustrated in U.S. Letters Patent No. 3,371,521 issued on Mar. 5, 1968. It is illustrated schematically in FIG. 1 as comprising a body 13 that may be split longitudinally, if desired, so that it may be clamped about a connection represented at 14 which is to be tested. An elastomer packer 15 is carried by the body 13.

Any suitable arrangement may be provided for surrounding the connection to seal it off so that a suitable pressure medium, such as liquid, or gas, preferably inert, may be applied externally to test the connection.

There may be other devices and arrangements, other than the device of the above patent available and known to those skilled in the art which may be employed for containing fluid externally of the connection and for applying external pressure in accordance with the present invention for testing the integrity of connection between tubular members.

The invention will be described in detail with regard to threaded connections; however, it can be applied to any type connection where pressure internally thereof tends to energize or seal the connection.

In FIGS. 1 and 2, the connection is shown as being in the form of coupling 9 which threadedly connects tubular members 20 and 21 together.

The body 13 is positioned to surround the connection 14 to seal it off. The seal is formed about coupling 9 and a portion of tubular members 20, 21 with which it is connected. A suitable pressure fluid such as liquid or gas, preferably inert, is then injected internally of packer 15 through an inlet 16, and any air within the void 17 surrounding the connection 14 and between the sealed connection and the elastomer packing element 15 which aids in sealing off the connection 14 may be discharged through the opening 18. Thereafter, suitable fluid pressure buildup may be applied to the contained fluid by closing off opening 18 to accomplish the tests as will be described herein. Suitable gauges (not shown) may be employed for noting pressure fall or decay. The above noted Pat. No. 3,371,521 shows one suitable arrangement.

The form of connection illustrated in FIG. 2 is an enlarged partial section of FIG. 1 which may be tested by the method of the present invention. The coupling 9 is connected between tubular members 20 and 21, which are provided with suitable threaded surfaces as shown at 22 and 23, respectively, for engagement with the threads 25 on the interior of the coupling 9.

Heretofore, testing of connections between tubular members has been accomplished by initially elevating the pressure internally of the connection to the range of approximately 5,000 to 15,000 p.s.i. However, this method of testing actually energizes the sealing relationship of the threads 22 and 23 with the threads 25 and tends to hide or mask any leak that might be present within the connection.

It can be appreciated that in the connection illustrated in FIG. 2 where the pressure medium is applied externally by any suitable source such as that schematically illustrated in FIG. 1 of the drawings, the pressure may be increased to that desired, for example, 7,500 through 15,000 p.s.i., or up to the collapse pressure rating of the tubular bodies 20, 21, and such pressure would act to tend to de-energize or decrease the bearing pressure between the tubular portions 20, 21 and the threaded coupling 9. The present invention, therefore, yields a more critical and more sensitive test as to the condition of the coupling and its threads and the tubular members 20, 21 including their threads connected therewith. Also, it determines if the connection strength approaches the collapse pressure rating of the tubular bodies in which the connection is formed.

Some types of connections are provided with multiple seals in an endeavor to improve and maintain the integrity of the particular type of connection between tubular members. In FIG. 3, there is illustrated one form of what is commonly referred to as a "Hydril" type threaded connection. This connection includes a box 30 and a pin 31, each of which has two step threads represented generally at 33 and 34 which are adapted to simultaneously coengage.

The box 30 is provided with an internal taper 36, and the lower end of the pin is provided with an external taper 37 adapted to engage the internal taper 36 and form a primary seal, or initial seal. An intermediate seat between the two step threaded surfaces 33 and 34 is shown at 39 which is formed by the shoulder 39a and 39b on the box 30 and pin 31, respectively, and an external shoulder seal between box 30 and pin 31 is represented generally at 40 formed by shoulder surfaces 46 and 47 on the end of the box 30 and on the pin 31 adjacent the end of the threads thereon.

In prior art practices, this connection has been tested by applying pressure internally, generally at least to the pressure at which the connection will be used, and when the connection is in the fully madeup or shouldered position as illustrated in FIG. 3 of the drawings, and such tests actually mask or hide any defects that may be present in the primary seal or in any other part of the connection which would affect the integrity thereof. The primary seal formed by the tapered surfaces 36 and 37 is self-energizing against internal pressure in that internal pressure forces the tapered portion 37 of the pin 31 more tightly against the taper 36 on the surrounding box 30 to form a better seal. Thus, internal pressure applied within the connection above that pressure which tends to overcome the compressive loading of the pin caused by its engagement with the tapered surfce 36 would cause tapers 36, 37 to move into tighter engagement and would actually fail to properly indicate whether or not the connection would maintain integrity under the conditions in which it might be employed.

For example only, where the connection is employed in tubular members in oil and gas wells, it is subjected to many varied conditions. It is generally known that the connections should be capable of withstanding external fluid pressures approaching the collapse pressure rating of the pipe body. Tubing in an oil or gas well is usually set with a packer, and mud of a sufficient weight to balance, or more generally to exceed, the shut-in bottom-hole pressure is left in the annulus behind this string. As bottom-hole formation pressures decline, the external pressure differential increases. The oil string is generally not subject to external pressures when initially set, but high external differentials do occur as bottom-hole pressures decline or when the fluid originally left in the annulus is replaced with a lighter fluid during workover operations.

The oil and tubing strings are initially subjected to tensile loads equivalent to the weight of the respective strings in the fluid in which they are set. Where the bottom sections of the strings are fixed, as casing when cemented and tubing when anchored, additional tensile loads will result if the pressure inside these strings is increased, or if the temperature decreases. Other loads, such as those imposed when reciprocating casing when cementing and pulling stuck packers with tubing, must be considered.

The connection should be designed to withstand high compressive loads without damage. In running both casing and tubing, obstructions are sometimes encountered, and most, if not all, of the weight of the string may be applied in an effort to get by the obstruction. A more general case of compressive loading of tubing strings is in setting packers.

Thus, it can be seen that connections in tubular members are subjected to varying internal and external pressures, temperatures, and load conditions. It is, therefore, desirable to test the connections to try to determine that they will maintain leak proof conditions under all circumstances.

Therefore, it is desirable to test the connection in the most critical manner possible in an endeavor to avoid pollution by leakage at the connection.

The present invention provides a critical test in that the connection of FIG. 3 is initially made up to the lowest torque necessary merely to obtain an initial seal between the tapered surface 37 on the pin 31 and the tapered surface 36 on the box 30. The amount of torque required to accomplish this will vary anywhere from 5 percent up to 50 percent of the recommended full makeup torque for the connection, and 10 percent to 20 percent of full makeup torque is generally the preferred range. At any event, when the initial test of the primary seal is conducted after the connection has been surrounded to seal it off, the amount of torque to accomplish the initial or primary seal should be such that there preferably is not an engagement by the shoulders 39a, 39b forming intermediate seat 39 on the pin 31 and box 30, nor should there be engagement of the tapered surfaces 46 and 47 which form the external shoulder seal 40. In other words, there preferably should be a clearance between surfaces 46 and 47 of at least some amount, say, for example only, 0.001 to 0.002 inch; however, the clearance will vary depending upon the type connection, and the weight, grade, and size of the tubular bodies. These conditions are known to those skilled in the art.

In some circumstances, due to damage, the shoulders 46 and 47 may engage at one or more places, but to conduct the so-called "low-torque" test of the present invention (when the connection is only partially made up), the shoulders 46 and 47 should not be in complete sealing engagement.

By way of example only, when the connection such as that illustrated in FIGS. 3 through 9 has been made up within the torque range at which the primary or initial seal should be formed in the connection, the external pressure applied may be up to the collapse rating of the tubular members; however, in most instances, it is approximately 60 percent of the collapse rating of the tubular members 30 and 31. The external test pressure may vary, as will be noted.

In the FIG. 3 form of connection, the pin is longer than the box so that the primary or initial seal between tapers 36 and 37 is formed before shoulder surfaces forming seat 39 and shoulder surfaces 46 and 47 engage.

With the primary or initial seal formed by applying a torque range above indicated and with no seal or sealing of surfaces 39a, 39b, 46, and 47, external pressure applied to the connection is conducted along the two step threads 33 and 34 to act against the primary or initial seal formed by the tapered surfaces 36 and 37. The amount of pressure applied to the primary seal generally may vary anywhere from about 3,000 to 8,000 p.s.i., or higher, as noted hereinbefore, and it can be appreciated that if the initial seal fails to leak under such circumstances, then the most critical test has been applied to the connection since it is being tested under those conditions which would be most conducive to its leaking if it were going to leak. That is, the seal formed by tapers 36 and 37 is formed with a minimum torque, possibly even handtight, and if the external pressure test of this invention tending to separate the tapers 36 and 37 cannot do so under such conditions, this indicates that the primary seal has actually been established between the tubular members 30, 31.

Under some circumstances, it may be desirable to conduct the tests on the connection as above described when the connection is out of tension; under some circumstances, it may be desirable to conduct the tests on the connection as above described when it is only in tension; and in other circumstances, it may be desirable to conduct the tests on the connection as described herein when it is out of tension and then placed in tension.

It can be further appreciated that the foregoing test applied to the primary seal will indicate whether or not there is damage to the connection which would prevent proper seating of the surfaces 36 and 37 to form a seal.

For example, if the pin 31 is, by way of example only, anywhere from 0.008 to 0.012 or 0.014 inch longer than the box 30 so that when the initial seal is supposed to be formed by the surfaces 36 and 37, there is a clearance between the upper tapered end surface 46 of the box 30 and the tapered annular surface 47 on the pin 31.

It can therefore be appreciated that damage to either of these surfaces by a protrusion or obstruction such as represented at 48 in FIG. 4 being formed thereon which is at least greater than the standoff distance between such shoulders when the tapered surfaces 36 and 37 should be in initial sealing contact would actually prevent the surfaces 36 and 37 from properly engaging to form the initial or primary seal, as illustrated in FIG. 5. In some instances, the shoulder damage may be an amount not readily visible, although sufficient to interfere with proper shouldering and preloading of the tapers 36 and 37 to form the primary internal seal, as shown in FIG. 5. The external test procedure above outlined would uncover such defect.

Furthermore, it can be appreciated that such damage or imperfection such as represented at 48 in FIG. 4 could be such that the torque gauge would indicate that the initial seal had been properly engaged since the recommended partial torque makeup would have been applied and indicated on the torque gauge used in making connection, and such torque would actually have been applied to the damaged portion 48.

After the primary seal has been tested in the form of connection of FIGS. 3–5, the connection may then be made up in its final relationship by applying whatever additional torque is necessary or required. The connection is then externally tested in the same manner, but the external pressure fluid may be applied approximately up to the collapse rating of the tubular members.

Since the surfaces 33a, 33b are tapered, they are designed to seal against external pressure and when the connection of FIGS. 3–5 is made up to full recommended torque, or to its final desired relationship, and then externally tested, this will determine if surfaces 33a and 33b are seating and sealing properly. Also, in some instances, this will mash any projection such as represented at 48, or correct minor surfaces defects in 46, 47.

After the connection of FIGS. 3–5 has been made up to full torque, it can then be determined if the makeup torque has corrected any failure of the primary seal to properly form. To accomplish this test, the connection is partially disconnected by backing off from the made up relationship of the connection by applying reverse torque, say, for example, until the connection is about one-half turn from made up position. The amount of backing off should be such that the initial or primary seal should be effective if there is no defect, foreign matter, or imperfection in the connection.

The internal seal is tested again by the application of external pressure in the amount of 4,000 to 8,000 p.s.i., or more, if desired. If the internal seal fails, then damage to the shoulder 46 or 47 or at the seat 39 or on the tapers 36, 37 is indicated or foreign matter is present which prevents proper seating, and the torque applied to the recommended full make up torque of the connection has merely been applied against the damaged surface or foreign matter without actually affecting a proper primary seal.

In FIG. 5, the taper 36 and the taper 37 on the end of the box 30 and the pin 31 are shown in enlarged detail in spaced relation due to damage represented at 48 in FIG. 4. When the primary seal has been properly established, 36 and 37 will be in sealing engagement and partially preloaded when 46 and 47 are in spaced relationship, that is, when the connection is in only partially made up condition as described herein. In the specific form of connection illustrated, the angle of the shoulders 37 and 36 is 14° and the angle on the shoulders or surfaces 46 and 47 shown in FIG. 4 in enlarged form is 30°. The angle on the surfaces 33a, 33b is 14°.

When fully made up, the 14° primary seal is the seal against internal pressure, whle the 14° on surfaces 33a, 33b is seal against external pressure applied thereto.

In FIG. 6, another form of connection well known to those skilled in the art is illustrated wherein a multiple seal arrangement is employed. In this connection, the box 50 is provided with internal threads 51, and the pin 52 is provided with external threads 53. An annular groove 54 is provided in the box in which is mounted an annular seal ring 55.

In the connection shown in FIG. 6, the pin 52 and box 50 are threaded together until the seal 55 engages with the unthreaded end 58 on the pin, as shown in FIG. 7, and at this point, there normally is approximately, by way of example only, about 0.058 inch clearance between the end 51a of the box 50 and shoulder 52a on the pin 52. This condition occurs on this connection when the tubular bodies are about one-half turn from fully made up position. If desired, a gauge can be employed between shoulders 51a and 52a as they are made up to determine this condition and to be sure they are in spaced relation.

After the connection is surrounded, external pressure between 4,000 to 8,000 p.s.i. or greater, if desired, is applied to the connection to determine the integrity of the internal seal formed between ring 55 and surface 58. In this type connection, it may be fully made up by applying additional torque and then externally testing up to the collapse rating of the tubular members.

This last mentioned test is similar to the test applied to the type of connection illustrated in FIG. 2 in that they are both in final made up position, preferably, when the external pressure test is conducted.

If desired, the foregoing tests may be conducted as above described while the connection has substantially no tension thereon; or the tests as above described may be conducted while the connection is in tension; or the tests as above described may be conducted while the connection is out of tension and then placed in tension so as to try to provide the most critical test as to the integrity of the connection.

Normally, in the type connection shown in FIGS. 6 and 7, if the low torque test fails, the connection would be unthreaded and the seal ring 55 checked.

In FIG. 8, another form of Hydril joint is shown. The box 30 and pin 31 are similar to that shown in FIG. 3, except the 14° taper is eliminated on surfces 33a, 33b, and the taper 36 stops at shoulder 36a which extends inwardly to the bore in the tubular body 30.

The testing of this connection may be carried out in the same manner as described with regard to FIGS. 3–7. FIG. 9 illustrates the pin and box in partially made up position for the "low torque test" previously described.

FIG. 9 illustrates surfaces 46 and 47 in spaced relation, and with the initial, primary seal formed at surfaces 36, 37. Since there is no damage to 46 or 47 or surfaces 36, 37, or foreign matter in the connection and no damage to threads 33, 34, or to shoulders 39a, 39b, the primary seal is properly formed by engagement of the surfaces 36, 37, and partially preloaded when the connection is partially made up as described herein.

After the Hydril joints of FIGS. 3–5 and 8, 9 have been made up to full torque, following a leak indication on the primary seal formed by 36, 37, they may be backed off, as described, and subsequent low torque external testing will indicate if the member 30, or member 31, has a defect which prevents them from making up in a manner to prevent leakage, or if there is foreign matter present.

It can be appreciated that on the low torque external stage test of the form of connection shown in FIGS. 3 through 9, a pressure drop or decay on a gauge that is connected to communicate with the pressure applied to the surrounded connection indicates that the connection is leaking. If no leak is present, then the present invention also establishes that the intermediate seal and the upper shoulder are not damaged sufficiently to interfere with the primary seal.

From the foregoing, it can be seen that if there are no leaks indicated when a connection is partially made up to the predetermined amount of torque at which the primary seal should be established, the connection may then be finally made up the desired amount by applying additional torque to complete the connection. It may be used, or it may then be further tested by surrounding the connection to seal it off and applying fluid pressure up to the collapse rating of the tubular members and noting whether or not there is any pressure decay indication on suitable instruments. If the connection does not leak when tested in partially made up condition, and when made up in its final relationship, this indicates that the connection should not leak during use.

If the test on the multiple seal connection when partially made up indicates a leak in the connection, it may be disconnected and inspected, or it may be tested further, depending upon the type of connection. If further tests are to be conducted, the connection is made up in its final relationship by applying additional torque. After it has been made up to its final relationship, the connection is backed off from such final made up position by applying a reverse torque, but the connection is maintained in its partially made up condition at which a primary seal should be established therein.

The partially made up connection is again tested as described herein to determine if any undesirable condition in the connection which originally may have caused the leak has been corrected by making the connection up to its final position with the additional torque. If the connection does not leak after this test, the undesirable condition in the connection has been corrected. If, however, the connection still leaks when tested in the partially made up condition, then the situation causing the leak was not corrected by applying the additional torque, and it should not be used.

It should be further noted that the external tests on any of the connections when fully made up, or the tests on a connection when it is fully made up and then backed off from its final made up position, if desired, may be conducted with the connection out of tension; they may be conducted when the connection is in tension, or they may be conducted when the connection is out of tension and then placed in tension.

The present invention may be employed in connection with the testing of casing, tubing, drill pipe, flow lines, pipelines, or any other tubular type conduit.

Also, the external test may be employed to test the connection in final made up position by applying a test pressure approaching the collapse pressure rating of the tubular bodies in which the connection is formed; however, in most instances, it is tested to approximately 1,000 p.s.i. above the conditions or pressure to which the connection would be subjected in use.

The foregoing disclosure and description of the invention are illustrative and explanatory thereof, and various changes in the size, shape, and materials as well as in the details of the illustrated construction may be made without departing from the spirit of the invention.

What is claimed is:

1. A method of testing a substantially full made up connection between tubular members comprising the steps of:
   a. surrounding the connection externally to seal it off;
   b. applying an external pressure to the surrrounded connection within the range of approximately 60 percent to approximately 90 percent of the collapse pressure rating of the tubular bodies; and
   c. while maintaining such pressure, determining any pressure decay as an indication of the integrity of the connection between the tubular bodies.

2. The invention of claim 1 wherein such test is conducted with substantially no tension in the connection and tubular bodies.

3. The invention of claim 1 wherein such test is conducted while a tension is applied to the connection.

4. A method of testing a connection between tubular members comprising the steps of:
   a. making up the connection between the tubular members in the range of about 5 percent to about 50 percent of the recommended full makeup torque for the connection;
   b. surrounding the connection externally to seal it off;
   c. applying an external pressure to the surrounded connection in an amount not greater than the collapse pressure rating of the tubular bodies; and
   d. determining any pressure decay from such amount.

5. The invention of claim 4 wherein such test is conducted with substantially no tension in the connection and tubular bodies.

6. The method of claim 5 including the additional steps of:
   supplying additional torque to the connection to make it up in its final position;
   surrounding the connection externally to seal it off;
   applying an external pressure to the surrounded connection in an amount not greater than the collapse pressure rating of the tubular bodies; and
   determining any pressure decay from such amount.

7. The invention of claim 6 wherein the test on the connection when it is made up to between 5 percent and 50 percent of the recommended full makeup torque is conducted with substantially no tension in the connection and wherein the test on the connection in its final position is made while tension is applied to the connection.

8. The invention of claim 6 wherein the test on the connection when it is made up to between 5 percent and 50 percent of the recommended full makeup torque is conducted with substantially no tension in the connection and wherein the test on the connection in its final position is made while substantially no tension is applied to the connection.

9. The method of claim 6 including the additional steps of:
   backing off the made up connection a predetermined amount;
   surrounding the connection externally to seal it off;
   applying an external pressure to the surrounded connection in an amount not greater than the collapse pressure rating of the tubular bodies; and
   determining any pressure decay from such amount.

10. A method of testing a connection between tubular members comprising the steps of:
    a. making up the connection between the tubular members to a predetermined amount of torque to effect a seal in the connection at less than the recommended full makeup torque for the connection;
    b. surrounding the connection externally to seal it off;
    c. applying an external pressure to the surrounded connection in an amount not greater than the collapse pressure rating of the tubular bodies; and
    d. determining any pressure decay from such amount.

11. The method of claim 10 including the additional steps of:
    supplying additional torque to the connection to make it up in its final position;
    surrounding the connection externally to seal it off;
    applying an external pressure to the surrounded connection in an amount not greater than the collapse pressure rating of the tubular bodies; and determining any pressure decay from such amount.

12. The invention of claim 11 wherein the test on the connection when it is made up at less than the recommended full makeup torque is conducted with substantially no tension in the connection and wherein the test on the connection in its final position is made while tension is applied to the connection.

13. The invention of claim 11 wherein the test on the connection when it is made up at less than the recommended full makeup torque is conducted with substantially no tension in the connection and wherein the test on the connection in its final position is made while substantially no tension is applied to the connection.

14. The method of claim 11 including the additional steps of:
- backing off the made up connection a predetermined amount;
- surrounding the connection externally to seal it off;
- applying an external pressure to the surrounded connection in an amount not greater than the collapse pressure rating of the tubular bodies; and
- determining any pressure decay from such amount.

15. A method of testing a connection between tubular members comprising the steps of:
- a. making up the connection between the tubular members until the tubular members are in spaced shoulder to shoulder relation by a predetermined amount to effect an initial seal in the connection;
- b. surrounding the connection externally to seal it off;
- c. applying an external pressure to the surrounded connection in an amount not greater than the collapse pressure rating of the tubular bodies; and
- d. determining any pressure decay from such amount.

16. The method of claim 15 including the additional steps of:
- supplying additional torque to the connection to make it up in its final position;
- surrounding the connection externally to seal it off;
- applying an external pressure to the surrounded connection in an amount not greater than the collapse pressure rating of the tubular bodies; and determining any pressure decay from such amount.

17. A process for leak testing a thread-connected, multiple-seal pipe joint having at least one inner seal and an external seal comprising:
- a. connecting the joint to a limited extent that engages at least one inner seal without engaging the external seal;
- b. surrounding the joint externally to seal it off;
- c. increasing fluid pressure externally of the joint to selected pressure significantly greater than the internal pressure; and
- d. detecting any resultant inflow into the joint of the pressurized external fluid.

18. The process of claim 17 in which the amounts of torque applied in connecting the threads of the pipe joint and external fluid pressurization are significantly less than those corresponding to full tool joint connection torque and full rated pressure resistance of the tool joint.

19. The process of claim 17 in which the pipe joint connecting and testing is conducted at a use location on pipe joints which are being quality control tested in a pipe string.

20. The method of claim 17 wherein such test is conducted with substantially no tension in the joint.

21. The method of claim 17 wherein such test is conducted while tension is applied to the joint.

22. The method of claim 17 including the additional steps of:
- a. connecting the joint to its final position;
- b. surrounding the joint externally to seal it off;
- c. increasing the fluid pressure externally to selected pressure significantly greater than the internal pressure; and
- d. detecting any resultant inflow into the joint of the pressurized external fluid.

23. The invention of claim 22 wherein the test on the joint when it is connected only a limited extent is conducted with substantially no tension in the joint and wherein the test on the joint in its final position is made while tension is applied to the joint.

* * * * *

UNITED STATES PATENT OFFICE
CERTIFICATE OF CORRECTION

Patent No. 3,871,209          Dated March 18, 1975

Inventor(s) Malvern M. Hasha

It is certified that error appears in the above-identified patent and that said Letters Patent are hereby corrected as shown below:

In the Abstract:

Col. 1, line 5, change "or" to --to--

Col. 7, line 45, change "whle" to --while--

Signed and sealed this 27th day of May 1975.

(SEAL)
Attest:

RUTH C. MASON
Attesting Officer

C. MARSHALL DANN
Commissioner of Patents
and Trademarks